United States Patent
Jikuhara et al.

(10) Patent No.: US 12,420,840 B2
(45) Date of Patent: Sep. 23, 2025

(54) SERVER APPARATUS, SYSTEM, AND OPERATING METHOD OF SYSTEM

(71) Applicant: TOYOTA JIDOSHA KABUSHIKI KAISHA, Toyota (JP)

(72) Inventors: Yoshikazu Jikuhara, Miyoshi (JP); Shin Sakurada, Toyota (JP); Tomokazu Maya, Nagoya (JP); Hiroyuki Bandai, Toyota (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 213 days.

(21) Appl. No.: 18/366,026

(22) Filed: Aug. 7, 2023

(65) Prior Publication Data
US 2024/0051580 A1 Feb. 15, 2024

(30) Foreign Application Priority Data
Aug. 9, 2022 (JP) .................. 2022-127465

(51) Int. Cl.
| | |
|---|---|
| B60W 60/00 | (2020.01) |
| G06Q 30/04 | (2012.01) |
| G06Q 50/40 | (2024.01) |
| G07F 17/12 | (2006.01) |
| G08G 1/00 | (2006.01) |

(52) U.S. Cl.
CPC ......... *B60W 60/0025* (2020.02); *G06Q 30/04* (2013.01); *G06Q 50/40* (2024.01); *G07F 17/12* (2013.01); *G08G 1/202* (2013.01); *B60W 2556/50* (2020.02)

(58) Field of Classification Search
CPC .......... B60W 60/0025; B60W 2556/50; G06Q 50/40; G06Q 30/04; G07F 17/12; G08G 1/202
See application file for complete search history.

(56) References Cited

U.S. PATENT DOCUMENTS

| | | | |
|---|---|---|---|
| 11,474,519 B2* | 10/2022 | Hicok | G05D 1/249 |
| 2020/0219179 A1* | 7/2020 | Matsumoto | G06Q 30/0283 |
| 2022/0058533 A1* | 2/2022 | Ha | G06Q 10/02 |
| 2022/0084109 A1* | 3/2022 | Numazawa | B60P 3/20 |
| 2022/0379916 A1* | 12/2022 | Ferguson | B60W 60/0051 |
| 2024/0212506 A1* | 6/2024 | Li | G06F 3/011 |

FOREIGN PATENT DOCUMENTS

JP 2000142477 A 5/2000

* cited by examiner

*Primary Examiner* — Peter D Nolan
*Assistant Examiner* — Mikko Okechukwu Obioha
(74) *Attorney, Agent, or Firm* — Dickinson Wright, PLLC

(57) ABSTRACT

A server apparatus includes a communication interface and a controller configured to communicate via the communication interface with at least one mobile object that has a changing room. The controller is configured to transmit an instruction to the mobile object to move to a specified location by a specified time.

15 Claims, 5 Drawing Sheets

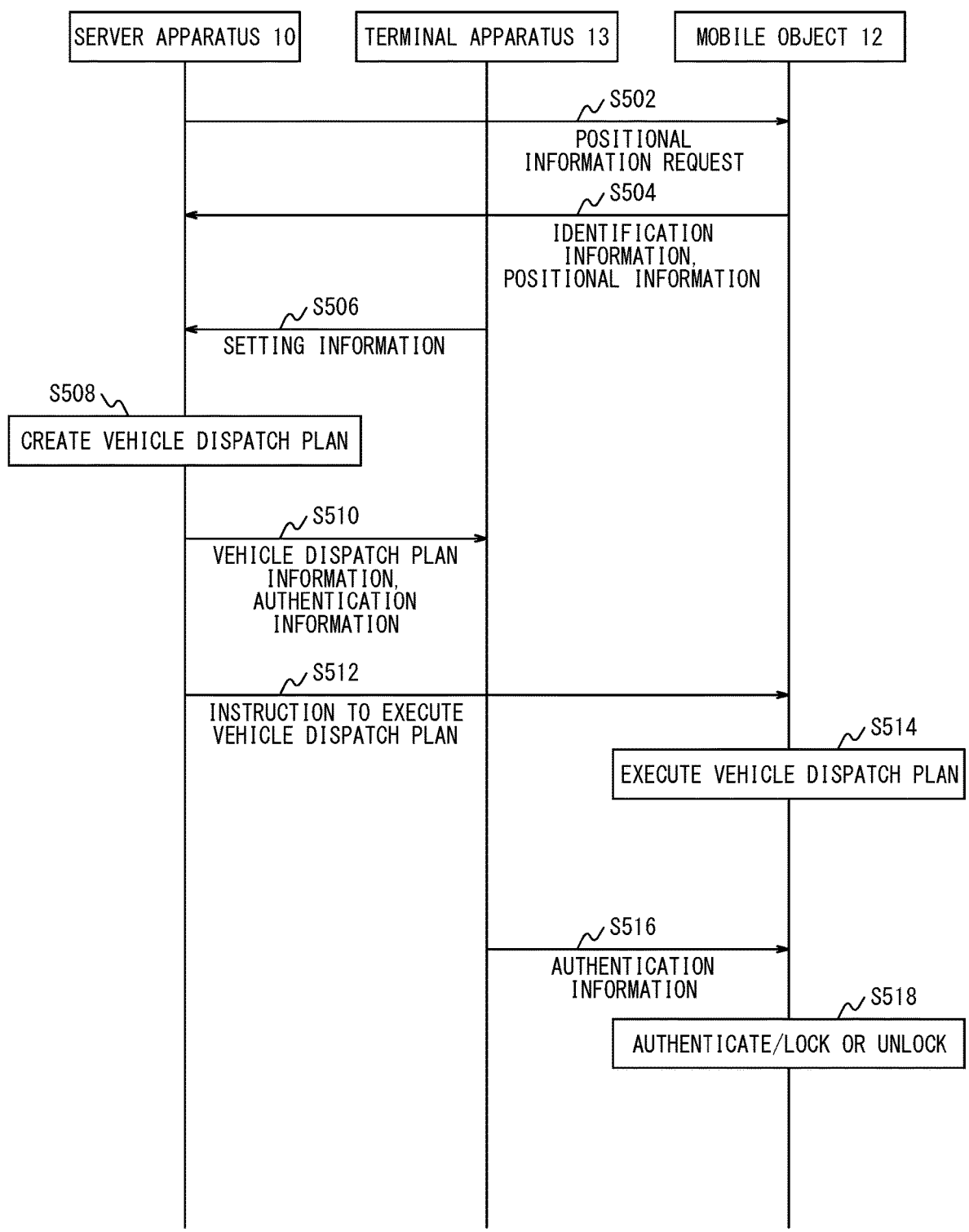

SERVER APPARATUS, SYSTEM, AND OPERATING METHOD OF SYSTEM

CROSS-REFERENCE TO RELATED APPLICATION

This application claims priority to Japanese Patent Application No. 2022-127465, filed on Aug. 9, 2022, the entire contents of which are incorporated herein by reference.

TECHNICAL FIELD

The present disclosure relates to a server apparatus, a system, and an operating method of a system.

BACKGROUND

In factories and various other business establishments, including offices, employees may be required to change into predetermined clothing, such as work clothes or uniforms. Since a certain degree of privacy is required for changing clothes, various means have been proposed for this purpose. For example, Patent Literature (PTL) 1 discloses a technique for changing the layout of the passenger compartment of a truck so that the passenger compartment can also be used as a changing room.

CITATION LIST

Patent Literature

PTL 1: JP 2000-142477 A

SUMMARY

There is room for improvement in the means for securing a changing room.

It would be helpful to disclose a server apparatus and the like that enable more efficient securing of a changing room.

A server apparatus in the present disclosure includes:
a communication interface; and
a controller configured to communicate via the communication interface with at least one mobile object that has a changing room, wherein
the controller is configured to transmit an instruction to the mobile object to move to a specified location by a specified time.

A system in the present disclosure is a system including a server apparatus and at least one mobile object configured to communicate with the server apparatus and having a changing room, wherein
the server apparatus is configured to transmit an instruction to the mobile object to move to a specified location by a specified time, and
the mobile object is configured to move in response to the instruction.

An operating method of a system in the present disclosure is an operating method of a system including a server apparatus and at least one mobile object configured to communicate with the server apparatus and having a changing room, the operating method including:
transmitting, by the server apparatus, an instruction to the mobile object to move to a specified location by a specified time; and
moving, by the mobile object, in response to the instruction.

According to the server apparatus and the like in the present disclosure, a changing room can be secured more efficiently.

BRIEF DESCRIPTION OF THE DRAWINGS

In the accompanying drawings:
FIG. 5 is a sequence diagram illustrating an operation example of an information processing system.

DETAILED DESCRIPTION

Embodiments are described below.

Figure 1:
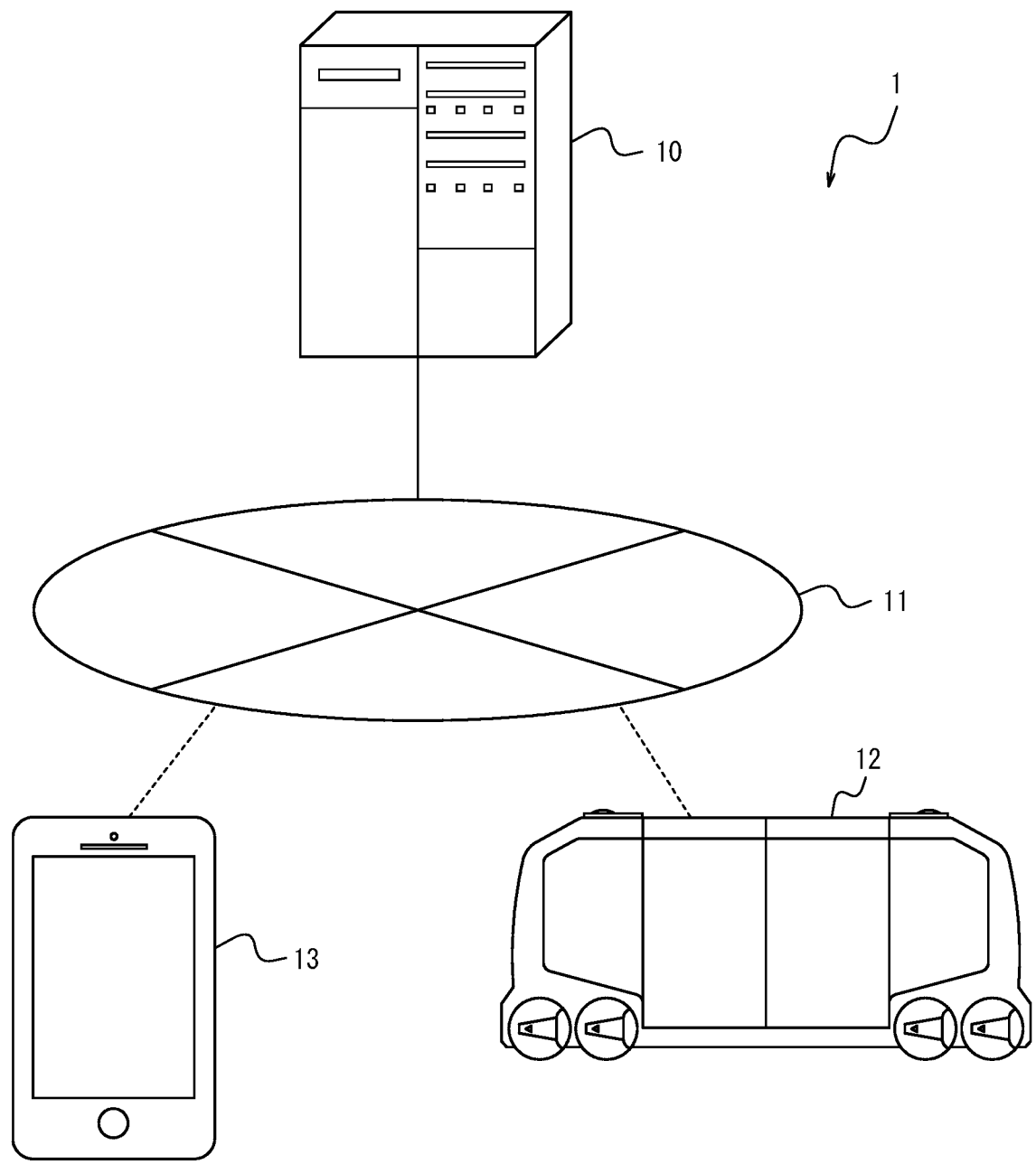
FIG. 1 is a diagram illustrating an example configuration of an information processing system.

FIG. 1 is a diagram illustrating a configuration example of an information processing system according to an embodiment. An information processing system 1 includes one or more each of a server apparatus 10, a mobile object 12, and a terminal apparatus 13 communicably connected to each other via a network 11. Under the control of the server apparatus 10, the information processing system 1 makes a mobile object 12, provided with a changing room, available to the user of the terminal apparatus 13.

The server apparatus 10 is, for example, a server computer that belongs to a cloud computing system or other computing system and functions as a server that implements various functions.

The mobile object 12 is, for example, a vehicle with a size equivalent to or larger than a small bus that has a total length of approximately 7 m, a width of approximately 2 m, and a height of approximately 3 m. The interior space of the mobile object 12 is equipped with a changing room for at least one person. Lockable lockers may be provided in the changing room. The mobile object 12 is connected to the network 11 via a mobile communication network. The mobile object 12 is driven manually, but a portion of driving may be automated. The mobile object 12 is any type of automobile such as a gasoline vehicle, a Battery Electric Vehicle (BEV), a Hybrid Electric Vehicle (HEV), a Plug-in Hybrid Electric Vehicle (PHEV), or a Fuel Cell Electric Vehicle (FCEV).

The terminal apparatus 13 is an information processing apparatus used by a user working in a factory, office, or other business location to transmit various instructions to the server apparatus 10 and receive various output information from the server apparatus 10. Examples of the terminal apparatus 13 include a terminal apparatus, a smartphone, and a personal computer (PC).

The network 11 is the Internet, for example, but may also be an ad-hoc network, a LAN, a Metropolitan Area Network (MAN), other networks, or a combination of two or more thereof.

In the present embodiment, the server apparatus 10 communicates with the mobile object 12, which has a changing room. The server apparatus 10 transmits an instruction to the mobile object 12 so that the mobile object 12 moves to a specified location by a specified time. The specified time and specified location are specified by the terminal apparatus 13. The specified time occurs at a predetermined amount of time, required for changing clothes, before the starting time of work or ending time of work at a work location. In this way, the mobile object 12 moves to the specified location by the specified time specified by the user on the terminal apparatus 13, thereby enabling the user to board the mobile object 12 at the specified location and change using the changing room. Therefore, even if the site and space of the business are too small to easily provide a changing room, the user can change clothes at a specified location near the business, and a permanent changing room becomes unnecessary. A changing room can thus be secured efficiently.

Figure 2:
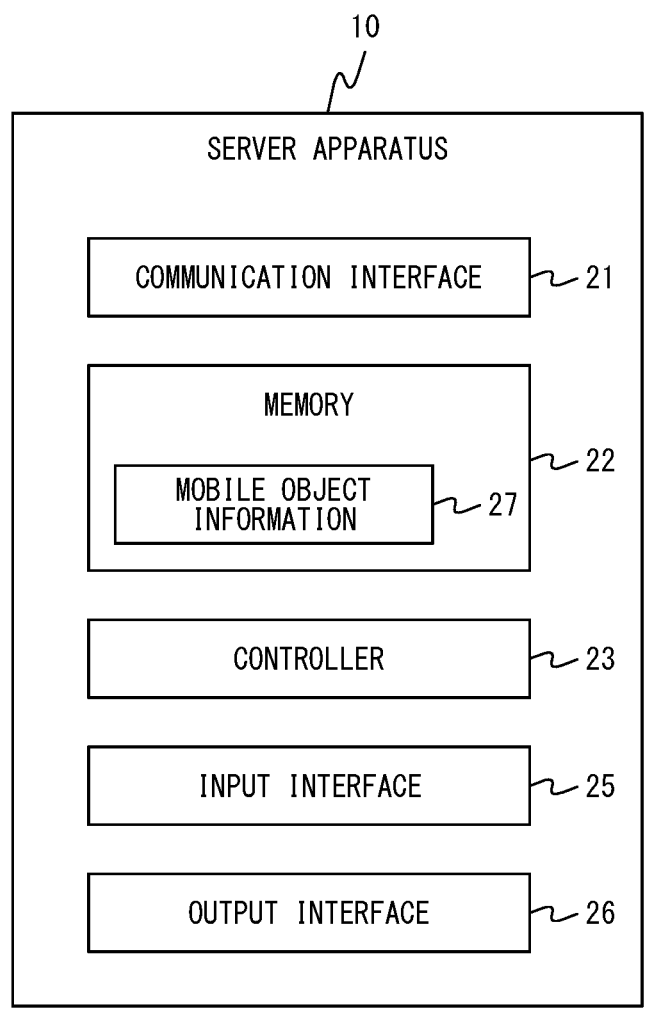
FIG. 2 is a diagram illustrating an example configuration of a server apparatus.

FIG. 2 illustrates an example configuration of the server apparatus 10. The server apparatus 10 includes a communication interface 21, a memory 22, a controller 23, an input interface 25, and an output interface 26. The server apparatus 10 is, for example, a single computer. The server apparatus 10 may be two or more server computers that are communicably connected to each other and operate in cooperation. In this case, the configuration illustrated in FIG. 2 is arranged among two or more server computers as appropriate.

The communication interface 21 includes one or more interfaces for communication. The interface for communication is, for example, a LAN interface. The communication interface 21 receives information to be used for the operations of the server apparatus 10 and transmits information obtained by the operations of the server apparatus 10. The server apparatus 10 is connected to the network 11 by the communication interface 21 and communicates information with the mobile object 12 or the terminal apparatus 13 via the network 11.

The memory 22 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 22 stores information to be used for the operations of the server apparatus 10 and information obtained by the operations of the server apparatus 10. Mobile object information 27 is stored in the memory 22. The mobile object information 27 includes information such as identification information for each mobile object 12 and the capacity of the on-board changing room.

The controller 23 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 23 executes information processing related to operations of the server apparatus 10 while controlling components of the server apparatus 10.

The input interface 25 includes one or more interfaces for input. The interface for input is, for example, a physical key, a capacitive key, a pointing device, a touch screen integrally provided with a display, or a microphone that receives audio input. The input interface 25 accepts operations to input information used for operation of the server apparatus 10 and transmits the inputted information to the controller 23.

The output interface 26 includes one or more interfaces for output. The interface for output is, for example, a display or a speaker. The display is, for example, a Liquid Crystal Display (LCD) or an organic Electro Luminescent (EL) display. The output interface 26 outputs information obtained by the operations of the server apparatus 10.

The functions of the server apparatus 10 are realized by a processor included in the controller 23 executing a control program. The control program is a program for causing a computer to execute the processing of steps included in the operations of the server apparatus 10, thereby enabling the computer to realize the functions corresponding to the processing of the steps. That is, the control program is a program for causing a computer to function as the server apparatus 10. Some or all of the functions of the server apparatus 10 may be realized by a dedicated circuit included in the controller 23. The control program may be stored on a non-transitory recording/storage medium readable by the server apparatus 10 and be read from the medium by the server apparatus 10.

Figure 3:
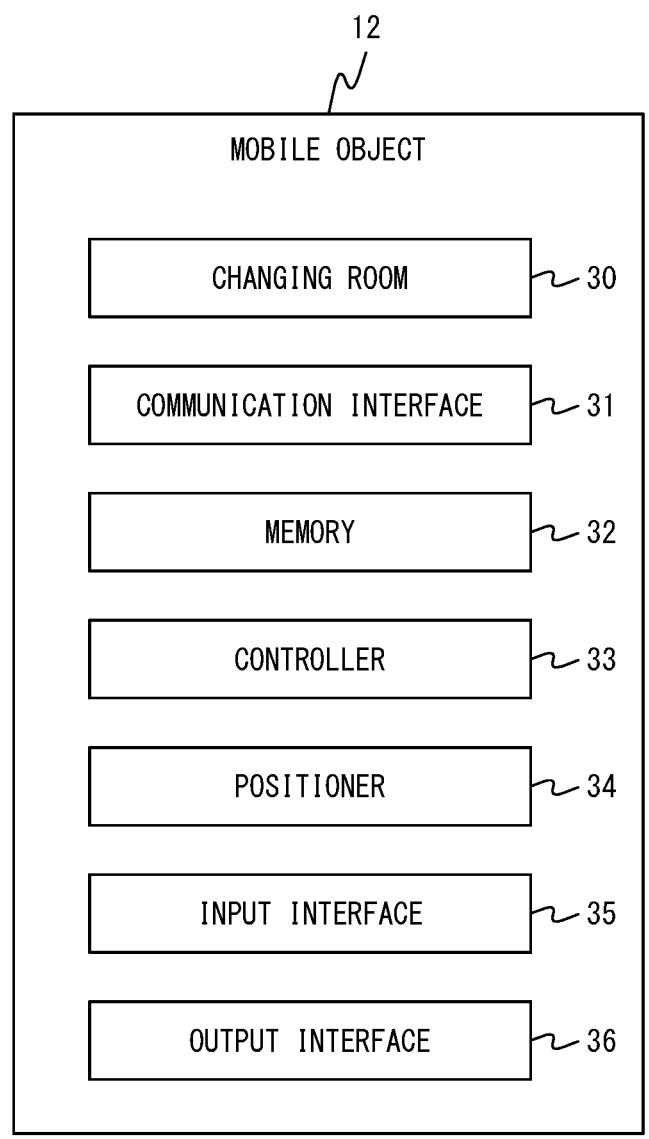
FIG. 3 is a diagram illustrating an example configuration of a mobile object.

FIG. 3 illustrates a configuration example of the mobile object 12. In addition to a changing room 30, the mobile object 12 includes a communication interface 31, a memory 32, a controller 33, a positioner 34, an input interface 35, and an output interface 36. These components may be configured as a single control apparatus, by two or more control apparatuses, or by other apparatuses, such as a control apparatus and a communication device. The control apparatus includes an electronic control unit (ECU), for example. The communication device includes a data communication module (DCM), for example. The control apparatus may be configured to include a personal computer, a tablet terminal, a smartphone terminal, a navigation apparatus, or the like. The components are communicably connected to each other, or to other devices and apparatuses in the mobile object 12, by an in-vehicle network compliant with standards such as a controller area network (CAN).

The changing room 30 is an indoor space where one or more users can change and includes lockers, partitions, and the like. The lockers are configured to be unlocked and locked under the control of the controller 33.

The communication interface 31 includes one or more interfaces for communication. Examples of the interface for communication include an interface corresponding to mobile communication standards, such as Long Term Evolution (LTE), 4th Generation (4G), or 5th Generation (5G). The communication interface 31 receives information to be used for the operations of the controller 33 and transmits information obtained by the operations of the controller 33. The controller 33 connects to the network 11 using the communication interface 31 through a mobile communication base station and communicates information with other apparatuses via the network 11.

The memory 32 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores information to be used for the operations of the controller 33 and information obtained by the operations of the controller 33.

The controller 33 includes one or more processors, one or more dedicated circuits, or a combination thereof. Examples of the processor include a general purpose processor such as a CPU and a dedicated processor dedicated to specific processing. The dedicated circuit is, for example, an FPGA or an ASIC. The controller 33 executes information processing pertaining to operations of the mobile object 12.

The positioner 34 includes one or more Global Navigation Satellite System (GNSS) receivers. The GNSS includes, for example, at least one of Global Positioning System (GPS), Quasi-Zenith Satellite System (QZSS), BeiDou, Global Navigation Satellite System (GLONASS), and Galileo. The positioner 34 acquires the positional information for the mobile object 12 and transmits the positional information to the controller 33.

The input interface 35 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 35 accepts user operations to input information used for operation of the controller 33 and transmits the inputted information to the controller 33.

The output interface 36 includes one or more interfaces for output. The interface for output is, for example, a display or a speaker. The display is, for example, an LCD or an organic EL display. The output interface 36 outputs the information obtained by the operation of controller 33, for example, to the user.

The functions of the controller 33 are realized by a processor included in the controller 33 executing a control program. The control program is a program for causing a computer to execute the processing of steps included in operations of the controller 33, thereby enabling the computer to realize the functions corresponding to the processing of the steps. That is, the control program is a program for causing a computer to function as the controller 33. Some or all of the functions of the controller 33 may be realized by a dedicated circuit included in the controller 33. The controller 33 generates information for control of various mechanisms and apparatuses of the mobile object 12 and transmits the information for control to the control circuits of the various mechanisms and apparatuses to control the mechanisms and apparatuses.

Figure 4:
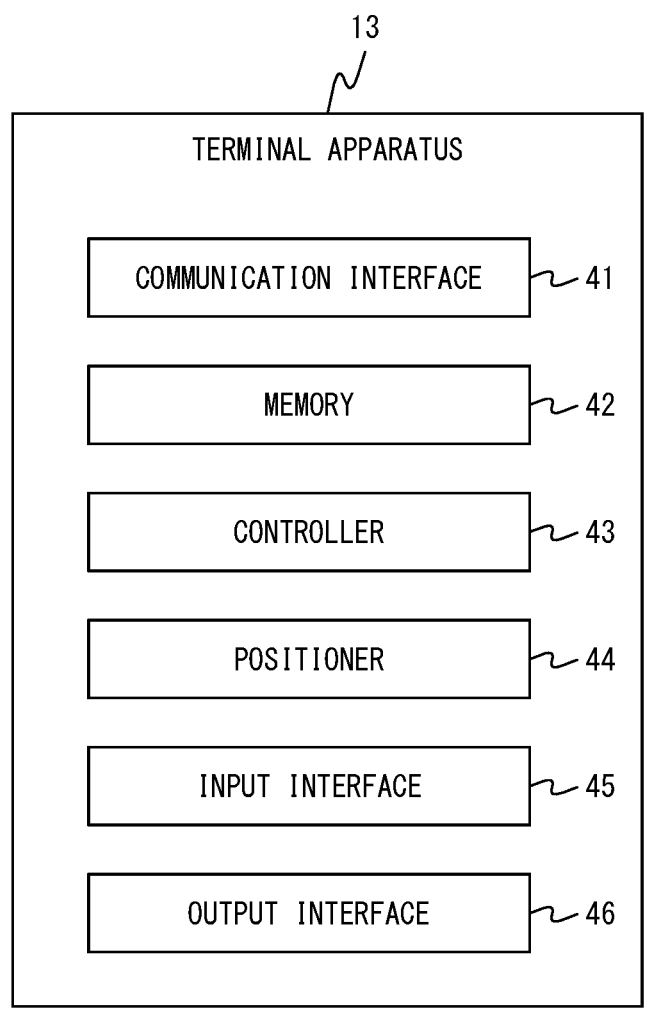
FIG. 4 is a diagram illustrating an example configuration of an information processing apparatus.

FIG. 4 is a diagram illustrating a configuration of the terminal apparatus 13. The terminal apparatus 13 is, for example, an information processing apparatus such as a tablet terminal apparatus, a smartphone, or a PC. The terminal apparatus 13 includes a communication interface 41, a memory 42, a controller 43, a positioner 44, an input interface 45, and an output interface 46.

The communication interface 41 includes a communication module compliant with a wired or wireless LAN standard, a module compliant with a mobile communication standard such as LTE, 4G, or 5G, or the like. The terminal apparatus 13 connects to the network 11 via a nearby router apparatus or mobile communication base station using the communication interface 41 and communicates information with other apparatuses over the network 11.

The memory 42 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 42 stores information to be used for the operations of the controller 43 and information obtained by the operations of the controller 43.

The controller 43 has one or more general purpose processors such as CPUs or micro processing units (MPUs) or one or more dedicated processors that are dedicated to specific processing. Alternatively, the controller 43 may have one or more dedicated circuits such as FPGAs or ASICs. The controller 43 is configured to perform overall control of the operations of the terminal apparatus 13 by operating according to the control/processing programs or operating according to operation procedures implemented in the form of circuits. The controller 43 then transmits and receives various types of information to and from the server apparatus 10 and the like via the communication interface 41 and executes the operations according to the present embodiment.

The positioner 44 includes one or more GNSS receivers. GNSS includes, for example, GPS, QZSS, BeiDou, GLONASS, and/or Galileo. The positioner 44 acquires the positional information for the terminal apparatus 13 and transmits the positional information to the controller 43.

The input interface 45 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 45 accepts operations for inputting information to be used in the operations of the controller 43 and transmits the inputted information to the controller 43.

The output interface 46 includes one or more interfaces for output. The interface for output is, for example, a display or a speaker. The display is, for example, an LCD or an organic EL display. The output interface 46 outputs information obtained by the operations of the controller 43.

The functions of the controller 43 are realized by a processor included in the controller 43 executing a control program. The control program is a program for causing the processor to function as the controller 43. Some or all of the functions of the controller 43 may be realized by a dedicated circuit included in the controller 43.

FIG. 5 is a sequence diagram to illustrate the operating procedures of the information processing system 1 in the present embodiment. FIG. 5 illustrates the steps in the coordinated operation of the server apparatus 10, the mobile object 12, and the terminal apparatus 13. The steps pertaining to the various information processing by the server apparatus 10, the mobile object 12, and the terminal apparatus 13 in FIG. 5 are performed by the respective controllers 23, 33, 43. The steps pertaining to transmitting and receiving various types of information to and from the server apparatus 10, the mobile object 12, and the terminal apparatus 13 are performed by the respective controllers 23, 33, 43 transmitting and receiving information to and from each other via the respective communication interfaces 21, 31, 41. In the server apparatus 10, the mobile object 12, and the terminal apparatus 13, the respective controllers 23, 33, 43 appropriately store the information that is transmitted and received in the respective memories 22, 32, 42. Furthermore, the controllers 23, 33, 43 accept input of various information by the respective input interfaces 35, 45 and output various information by the respective output interfaces 36, 46.

In step S502, the server apparatus 10 issues a request for positional information to the mobile object 12. The positional information is information indicating the current position of the mobile object 12. The server apparatus 10 stores information identifying the mobile object 12 in the memory 22 in advance and transmits information for requesting the positional information to the mobile object 12 using the identification information. In a case in which there is a plurality of mobile objects 12, the server apparatus 10 issues a request for positional information to each mobile object 12.

In step S504, the mobile object 12 transmits its own positional information to the server apparatus 10. The positional information is generated by the controller 33 using information acquired by the positioner 34. In a case in which there is a plurality of mobile objects 12, each mobile object 12 transmits its positional information to the server apparatus 10. The server apparatus 10 thereby manages the positional information for each mobile object 12.

In step S506, the terminal apparatus 13 transmits setting information to the server apparatus 10. The setting information includes identification information for the user, a specified location specified by the user for changing clothes, and a desired time of arrival of the mobile object 12 at the specified location. The desired time of arrival is a time, set freely by the user, that occurs at a predetermined amount of time, required for changing clothes, before the starting time of work or ending time of work at the user's work location. The user transmits the setting information to the server apparatus 10 using the terminal apparatus 13. For example, the user accesses a site provided by the server apparatus 10 via the terminal apparatus 13, and the server apparatus 10 presents map information. The setting information is then transmitted to the server apparatus 10 by the user using the terminal apparatus 13 to identify the specified location in the map information and input the desired time of arrival. The desired time of arrival that occurs at a predetermined amount of time, required for changing clothes, earlier may be derived on the terminal apparatus 13 or the server apparatus 10 upon the user inputting the starting time of work or ending time of work. Any appropriate time, such as 5 to 15 minutes, is set in advance as the time required for changing clothes.

In step S508, the server apparatus 10 creates a vehicle distribution plan. The vehicle distribution plan includes the mobile object 12 to be dispatched to the specified location in response to the request by the user, and the travel route and schedule of the mobile object 12. The server apparatus 10, for example, identifies the mobile object 12 whose current position is closest to the specified location as the target for dispatch. Alternatively, the server apparatus 10 may refer to an already determined vehicle dispatch plan and identify, as the target for dispatch, the mobile object 12 that is scheduled to be located within a distance range that enables arrival at the specified location by the desired time of arrival in the case of traveling at the legal speed. The travel route is the route from the current position or planned position of the mobile object 12 targeted for vehicle dispatch to the specified location. The travel route is derived by any appropriate algorithm. The schedule includes the time at which the mobile object 12 starts traveling along the travel route, the time when the mobile object 12 passes through any intermediate point on the travel route, the estimated time of arrival at the specified location, and the like. The schedule is derived based on the travel route of the mobile object 12 and the travel speed (for example, the legal speed).

In step S510, the server apparatus 10 transmits vehicle dispatch plan information and authentication information to the terminal apparatus 13. The terminal apparatus 13 displays the vehicle dispatch plan to present the vehicle dispatch plan to the user, so that the user can confirm the vehicle dispatch plan. The authentication information is information used to unlock and lock the lockers of the mobile object 12. The server apparatus 10 stores authentication information for each mobile object 12 in advance in the memory 22, and the authentication information corresponding to the mobile object 12 targeted for dispatch is retrieved and transmitted to the terminal apparatus 13. Upon confirming the vehicle dispatch plan, the user may transmit an instruction to execute the plan from the terminal apparatus 13 to the server apparatus 10. The user can travel to the specified location by the desired time of arrival based on the vehicle dispatch plan.

In step S512, the server apparatus 10 transmits the instruction to execute the vehicle dispatch plan to the mobile object 12. The instruction to execute the vehicle dispatch plan includes information on the travel route and the schedule for each mobile object 12.

In step S514, the mobile object 12 starts traveling according to the travel route and schedule and executes the vehicle dispatch plan. The mobile object 12 may travel automatically under the control of the controller 43, or the controller 43, which may be partially or fully operated by a crew member, may display or otherwise present the vehicle dispatch plan to the driver. The mobile object 12 stands by upon arrival at the specified location.

In step S516, the terminal apparatus 13 transmits authentication information to the mobile object 12. When the user boards the mobile object 12 at the specified location to use a locker, the authentication information is transmitted from the terminal apparatus 13.

In step S518, the mobile object 12 unlocks or locks the locker. The mobile object 12 receives the authentication information via the communication interface 31 or the input interface 35 and unlocks or locks the locker under the control of the controller 33. In this way, the locker is made available to the user. Security is thus ensured by unlocking and locking lockers using the authentication information.

Steps S506 to S510 of the procedure in FIG. 5 may be executed once or each time a vehicle is dispatched. Steps S512 to S518, on the other hand, are executed each time a vehicle is dispatched. For example, before leaving for work, the user sets the desired time of arrival before the starting time of work and before the ending time of work, and the server apparatus 10 dispatches a vehicle each time according to the desired time of arrival before the starting time of work and the desired time of arrival before the ending time of work. The user may also set the desired time of arrival for several days or more at a time at the beginning of a week or month, for example. Alternatively, the user may, before leaving for work, set the desired time of arrival before the starting time of work and then, during work hours, set the desired time of arrival before the ending time of work.

In a case in which a plurality of users each use a terminal apparatus 13, each terminal apparatus 13 transmits setting information to the server apparatus 10. The server apparatus 10 manages the setting information for each user's identification information. The mobile object 12 is then identified and a vehicle dispatch plan is created for each user. At this time, the server apparatus 10 may create a different vehicle dispatch plan for each mobile object or may create a vehicle dispatch plan such that one mobile object 12 is shared by a plurality of users.

For example, in a case in which a vehicle dispatch plan has already been created and a specified location that is the same as or close to that of the created vehicle dispatch plan is designated when the server apparatus 10 accepts setting information from a terminal apparatus 13 in step S506, the server apparatus 10 may return a notification to the terminal apparatus 13 prompting to change the specified location and may accept specification of a different specified location. In this way, a vehicle dispatch plan with different specified locations for each mobile object 12 can be created. A situation in which a plurality of mobile objects 12 are crowded together at the same specified location or nearby specified locations, causing traffic congestion, can thereby be avoided.

Alternatively, in a case in which a vehicle dispatch plan has already been created and there is space in the changing room of the mobile object 12 when the server apparatus 10 accepts setting information from a terminal apparatus 13 in step S506, the server apparatus 10 can present the specified location and desired time of arrival that were set for other users in the created vehicle dispatch plan to the user of the terminal apparatus 13 for the user to select. As needed, the server apparatus 10 stores and updates, in the memory 22, information regarding the capacity of the changing room for each mobile object 12 and the remaining availability in a case in which the changing room is occupied by the vehicle dispatch plan. This enables the server apparatus 10 to monitor the availability of the changing room in the mobile object 12. The server apparatus 10 may transmit information regarding the availability of the mobile object 12 to the terminal apparatus 13, and terminal apparatus 13 may present the availability to the user by, for example, displaying the availability. By a plurality of users setting the same specified location and desired time of arrival, the mobile object 12 can provide a changing room to a plurality of users at the same time. For example, a situation in which a plurality of mobile objects 12 are crowded together at the same specified location or nearby specified locations, causing traffic congestion, can thereby be avoided.

An incentive can be offered to a user who shares the changing room in the mobile object 12 with another user. A changing room may, for example, be provided by the mobile object 12 as a paid service. In this case, when transmitting the vehicle dispatch plan information to the terminal apparatus 13 in step S510, the server apparatus 10 uses the identification information for the user to charge the user on the condition that consent is received from the terminal apparatus 13. At that time, the server apparatus 10 executes the charging process at a discounted rate for a user who sets the same specified location and estimated time of arrival as other users. Users can be encouraged to share by offering a discount to users who share a changing room.

According to the above-described procedures, even if the site and space of a business are too small to easily provide a changing room, a changing room for users can be secured. By a plurality of users being encouraged to share the changing room in the mobile object 12, a plurality of mobile objects 12 can be prevented from crowding together at a specified location near the business.

In the above embodiment, a processing/control program that specifies operations of the mobile object 12 and the terminal apparatus 13 may be stored in the memory 22 of the server apparatus 10 or in the memory of another server apparatus and be downloaded onto each apparatus via the network 11. The processing/control program may also be stored on a non-transitory recording/storage medium readable by each apparatus, and each apparatus may read the program from the medium.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

Examples of some embodiments of the present disclosure are described below. However, it should be noted that the embodiments of the present disclosure are not limited to these examples.

[Appendix 1] A server apparatus comprising:
  a communication interface; and
  a controller configured to communicate via the communication interface with at least one mobile object that has a changing room, wherein
  the controller is configured to transmit an instruction to the mobile object to move to a specified location by a specified time.

[Appendix 2] The server apparatus according to appendix 1, wherein the controller is configured to receive information indicating the specified time or the specified location from at least one terminal apparatus that communicates via the communication interface.

[Appendix 3] The server apparatus according to appendix 1 or 2, wherein the specified time is determined based on a starting time of work or ending time of work at a work location.

[Appendix 4] The server apparatus according to any one of appendices 1 to 3, wherein the at least one mobile object comprises a plurality of mobile objects, and the controller is configured to determine a different specified location for each mobile object among the plurality of mobile objects.

[Appendix 5] The server apparatus according to any one of appendices 2 to 4, wherein the at least one terminal apparatus comprises a plurality of terminal apparatuses, and when the controller receives information indicating the specified time or the specified location from the plurality of terminal apparatuses, the controller is configured to determine one specified time or one specified location and transmit the instruction to the mobile object.

[Appendix 6] The server apparatus according to appendix 5, wherein the controller is configured to execute a process to charge a user of one terminal apparatus among the plurality of terminal apparatuses a lower fee than a user of another terminal apparatus.

[Appendix 7] The server apparatus according to any one of appendices 2 to 6, wherein the controller is configured to transmit information to the terminal apparatus for opening and closing a locker provided in the mobile object.

[Appendix 8] A system comprising a server apparatus and at least one mobile object configured to communicate with the server apparatus and having a changing room, wherein
  the server apparatus is configured to transmit an instruction to the mobile object to move to a specified location by a specified time, and
  the mobile object is configured to move in response to the instruction.

[Appendix 9] The system according to appendix 8, wherein the server apparatus is configured to receive information indicating the specified time or the specified location from at least one terminal apparatus.

[Appendix 10] The system according to appendix 8 or 9, wherein the specified time is determined based on a starting time of work or ending time of work at a work location.

[Appendix 11] The system according to any one of appendices 8 to 10, wherein the at least one mobile object comprises a plurality of mobile objects, and the server apparatus is configured to determine a different specified location for each mobile object among the plurality of mobile objects.

[Appendix 12] The system according to any one of appendices 9 to 11, wherein the at least one terminal apparatus comprises a plurality of terminal apparatuses, and when the server apparatus receives information indicating the specified time or the specified location from the plurality of terminal apparatuses, the server apparatus is configured to determine one specified time or one specified location and transmit the instruction to the mobile object.

[Appendix 13] The system according to appendix 12, wherein the server apparatus is configured to execute a process to charge a user of one terminal apparatus among the plurality of terminal apparatuses a lower fee than a user of another terminal apparatus.

[Appendix 14] The system according to any one of appendices 9 to 13, wherein the server apparatus is configured to transmit information to the terminal apparatus for opening and closing a locker provided in the mobile object.

[Appendix 15] An operating method of a system comprising a server apparatus and at least one mobile object configured to communicate with the server apparatus and having a changing room, the operating method comprising:
- transmitting, by the server apparatus, an instruction to the mobile object to move to a specified location by a specified time; and
- moving, by the mobile object, in response to the instruction.

[Appendix 16] The operating method according to appendix 15, wherein the server apparatus receives information indicating the specified time or the specified location from at least one terminal apparatus.

[Appendix 17] The operating method according to appendix 15 or 16, wherein the specified time is determined based on a starting time of work or ending time of work at a work location.

[Appendix 18] The operating method according to any one of appendices 15 to 17, wherein the at least one mobile object comprises a plurality of mobile objects, and the server apparatus determines a different specified location for each mobile object among the plurality of mobile objects.

[Appendix 19] The operating method according to any one of appendices 16 to 18, wherein the at least one terminal apparatus comprises a plurality of terminal apparatuses, and when the server apparatus receives information indicating the specified time or the specified location from the plurality of terminal apparatuses, the server apparatus determines one specified time or one specified location and transmits the instruction to the mobile object.

[Appendix 20] The operating method according to appendix 19, wherein the server apparatus executes a process to charge a user of one terminal apparatus among the plurality of terminal apparatuses a lower fee than a user of another terminal apparatus.

The invention claimed is:

1. A server apparatus comprising:
a communication interface; and
a controller configured to communicate via the communication interface with at least one mobile object that has a changing room, wherein
the controller is further configured to
receive a first dispatch request via the communication interface from a first terminal apparatus used by a first user, the first dispatch request indicating a first specified time and a first specified location which are specified by the first user,
generate, based on the first dispatch request, a first dispatch plan to instruct a first mobile object of the at least one object to move to the first specified location by the first specified time,
receive a second dispatch request via the communication interface from a second terminal apparatus used by a second user, the second dispatch request indicating a second specified time and a second specified location which are specified by the second user,
based on determining that there is space in the changing room of the first mobile object when the second dispatch request is received, transmit the first dispatch plan via the communication interface to the second terminal apparatus to prompt the second user to share the changing room of the first mobile object with the first user, and
based on receiving, via the communication interface from the second terminal apparatus, information accepting the first dispatch plan, transmit the first dispatch plan via the communication interface to the first mobile object.

2. The server apparatus according to claim 1, wherein the controller is further configured to
based on determining that the second specified location is identical or close to the first specified location, transmit, via the communication interface to the second terminal apparatus, a notification prompting the second user to change the second specified location, and
based on receiving, via the communication interface from the second terminal apparatus, information specifying a third specified location different from the first and second specified locations, generate a second dispatch plan to instruct a second mobile object of the at least one object to move to the third specified location by the second specified time, and transmit the second dispatch plan via the communication interface to the second mobile object.

3. The server apparatus according to claim 1, wherein the controller is further configured to
monitor availability of the changing room of each of the at least one mobile object, and
transmit information regarding availability of each of the at least one mobile object to each of a plurality of terminal apparatuses including the first terminal apparatus and the second terminal apparatus.

4. The server apparatus according to claim 1, wherein the controller is further configured to identify, from among the at least one mobile object, a mobile object whose current position is closest to the first specified location, as the first mobile object.

5. The server apparatus according to claim 1, wherein the first specified time is determined based on a first starting time of work or a first ending time of work at a first work location of the first user; and
the second specified time is determined based on a second starting time of work or a second ending time of work at a second work location of the second user.

6. The server apparatus according to claim 1, wherein the controller is further configured to, based on receiving, via the communication interface from the second terminal apparatus, the information accepting the first dispatch plan, execute a process to charge the first user of and the second user who share the changing room a lower fee than other users of other terminal apparatuses who do not share the changing room.

7. The server apparatus according to claim 1, wherein the controller is further configured to, based on receiving, via the communication interface from the second terminal apparatus, the information accepting the first dispatch plan, transmit, via the communication interface to the first terminal apparatus and the second terminal apparatus, information for opening and closing a locker provided in the first mobile object.

8. A system comprising a server apparatus and at least one mobile object configured to communicate with the server apparatus and having a changing room, wherein
the server apparatus is configured to
receive a first dispatch request from a first terminal apparatus used by a first user, the first dispatch request indicating a first specified time and a first specified location which are specified by the first user,
generate, based on the first dispatch request, a first dispatch plan to instruct a first mobile object of the at least one object to move to the first specified location by the first specified time,
receive a second dispatch request from a second terminal apparatus used by a second user, the second dispatch request indicating a second specified time and a second specified location which are specified by the second user,
based on determining that there is space in the changing room of the first mobile object when the second dispatch request is received, transmit the first dispatch plan to the second terminal apparatus to prompt the second user to share the changing room of the first mobile object with the first user, and
based on receiving, from the second terminal apparatus, information accepting the first dispatch plan, transmit the first dispatch plan via the communication interface to the first mobile object, and
the first mobile object is configured to move, based on the first dispatch plan.

9. The system according to claim 8, wherein the first specified time is determined based on a first starting time of work or a first ending time of work at a first work location of the first user, and
the second specified time is determined based on a second starting time of work or a second ending time of work at a second work location of the second user.

10. The system according to claim 8, wherein the server apparatus is further configured to, based on receiving, from the second terminal apparatus, the information accepting the first dispatch plan, execute a process to charge the first user and the second user who share the changing room a lower fee than other users of other terminal apparatuses who do not share the changing room.

11. The system according to claim 8, wherein the server apparatus is further configured to, based on receiving, from the second terminal apparatus, the information accepting the first dispatch plan, transmit, to the first terminal apparatus and the second terminal apparatus, information for opening and closing a locker provided in the first mobile object.

12. An operating method of a server apparatus configured to communicate with at least one mobile object that has a changing room, the operating method comprising:
receiving a first dispatch request from a first terminal apparatus used by a first user, the first dispatch request indicating a first specified time and a first specified location which are specified by the first user;
generating, based on the first dispatch request, a first dispatch plan to instruct a first mobile object of the at least one object to move to the first specified location by the first specified time;
receiving a second dispatch request from a second terminal apparatus used by a second user, the second dispatch request indicating a second specified time and a second specified location which are specified by the second user;
based on determining that there is space in the changing room of the first mobile object when the second dispatch request is received, transmitting the first dispatch plan to the second terminal apparatus to prompt the second user to share the changing room of the first mobile object with the first user; and
based on receiving, from the second terminal apparatus, information accepting the first dispatch plan, transmitting the first dispatch plan to the first mobile object.

13. The operating method according to claim 12, wherein the first specified time is determined based on a first starting time of work or a first ending time of work at a first work location of the first user, and
the second specified time is determined based on a second starting time of work or a second ending time of work at a second work location of the second user.

14. The operating method according to claim 12, further comprising:
based on receiving, from the second terminal apparatus, the information accepting the first dispatch plan, executing a process to charge the first user and the second user who share the changing room a lower fee than other users of other terminal apparatuses who do not share the changing room.

15. The operating method according to claim 12, further comprising:
based on receiving, from the second terminal apparatus, the information accepting the first dispatch plan, transmitting, to the first terminal apparatus and the second terminal apparatus, information for opening and closing a locker provided in the first mobile object.

* * * * *